United States Patent [19]
Johnston

[11] Patent Number: 4,877,184
[45] Date of Patent: * Oct. 31, 1989

[54] EXHAUST HEATED TRAILER

[76] Inventor: William T. Johnston, P.O. Box 3820, Randolph, Ohio 44601

[ * ] Notice: The portion of the term of this patent subsequent to Jun. 21, 2005 has been disclaimed.

[21] Appl. No.: 209,289

[22] Filed: Jun. 20, 1988

Related U.S. Application Data

[63] Continuation of Ser. No. 935,839, Nov. 28, 1986, Pat. No. 4,751,873.

[51] Int. Cl.[4] .............................................. B60H 1/02
[52] U.S. Cl. .............................. 237/12.3 C; 298/1 H; 98/6
[58] Field of Search ................... 298/1 H; 98/6, 8, 10; 237/12.3 C, 12.3 A, 12.3 B, 12.3 R; 432/500, 120

[56] References Cited

U.S. PATENT DOCUMENTS 2,721,097 10/1955 Rittenhouse ........................ 298/1 H
3,472,548 10/1969 Comisac ............................. 298/1 H
4,751,873 6/1988 Johnston .................................. 98/6

Primary Examiner—Henry A. Bennet
Attorney, Agent, or Firm—Fay, Sharpe, Beall, Fagan, Minnich & McKee

[57] ABSTRACT

A heating system for a transportable enclosure comprising a first side wall and a second side wall; the first side wall being an exterior wall and the second side wall being an interior wall; a third side wall connected to and facing the second side wall, a fourth side wall defining an interior space of the enclosure; the second side wall and the third side wall defining a predetermined space therebetween; an inlet passage provided at a first location in communication with said predetermined space therebetween; an inlet passage provided at a first location in communication with said predetermined space; an air passage provided at a second location in communication with said predetermined space; heating means for supplying heat to said inlet passage; conduit means for connecting said heating means and said inlet passage; means for distributing said heat throughout said predetermined space; and, exhaust means for exhausting said heat from said predetermined space.

1 Claim, 2 Drawing Sheets

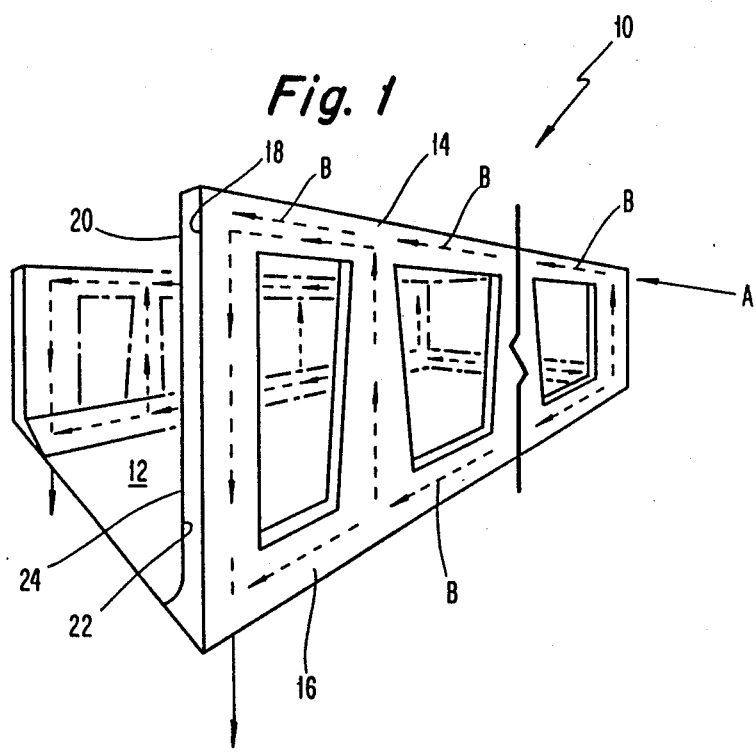

U.S. Patent   Oct. 31, 1989   Sheet 2 of 2   4,877,184
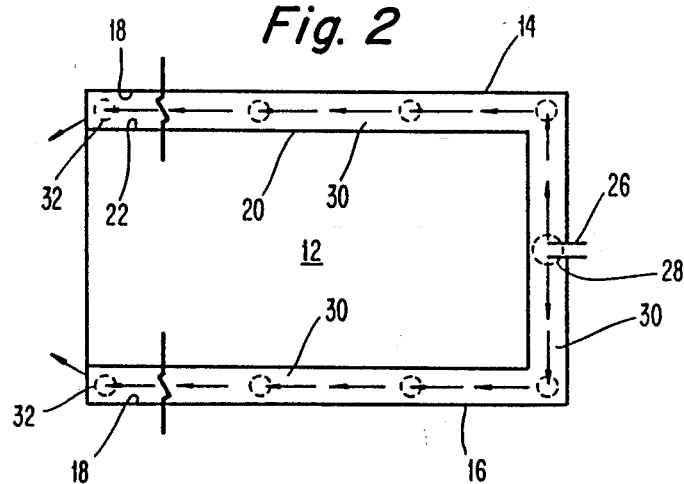
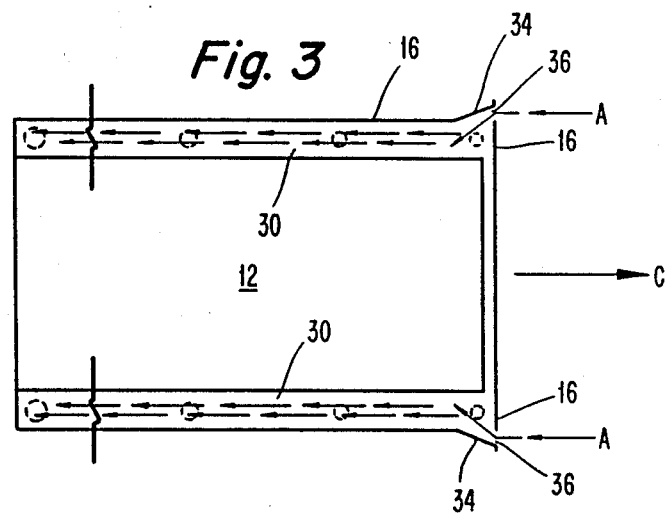
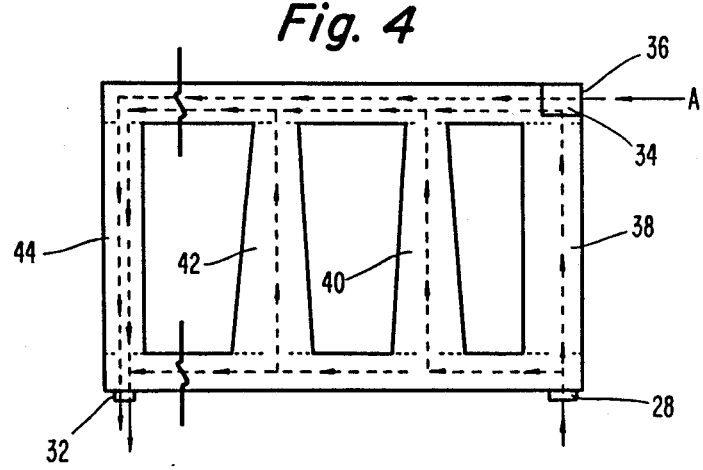

EXHAUST HEATED TRAILER

This is a continuation of Ser. No. 935,839 filed on Nov. 28, 1986 now U.S. Pat. No. 4,751,873.

BACKGROUND OF THE INVENTION

The present invention relates to an arrangement whereby a trailer may be heated by the heated exhaust gases of a vehicle. The trailer is attached to and pulled by the vehicle having the engine. Heat is conducted from the engine, in the form of the heated exhaust gases, to an inlet of the trailer.

Prior arrangement of this type are exemplified by U.S. Pat. No. 2,275,622 wherein a vehicle is provided with an exhaust pipe for supplying heated exhaust gases through a tube. The tube is located within an interior space of the trailer being pulled by the vehicle. An aperture is formed near the base of the trailer bed so as to admit cold air. The air flows upwards and around the tube containing the heated exhaust gases. The heated air is then supplied to a tubular outlet which leads to a fan box in an outlet funnel. The heated ambient air is then supplied directly inside the trailer.

Another example of known arrangements is set forth in British Patent Specification No. 305,627 wherein a fresh air inlet is provided around the intake manifold of the vehicle. Fresh air is drawn in by the vacuum developed due to a connection of the air inlet with the exhaust pipe. As the air is drawn across the engine or exhaust manifold it is delivered to a device which acts as a heat exchanger. Fresh air may be admitted through an air inlet device which flows around and across the pipe containing the heated air. The fresh air, after being heated by the interior heat radiating pipe, is then directly delivered through an inlet duct to the interior of the vehicle.

SUMMARY OF THE INVENTION

The present invention is directed to a double wall type trailer in which an interior cargo space defined for carrying cargo which needs to be heated. The heat is supplied from the exhaust gases of the engine driven vehicle which transports the trailer so that the exhaust gases are delivered to a side wall space defined between an inner wall and an outer wall of the trailer. The heated exhaust gases are supplied to an inlet located along a bottom region of the trailer. At a uppermost region of the trailer, ambient air intakes are provided so as to direct air into the space between the side walls of the trailer. The incoming ambient air creates a pressure differential which pulls the heated exhaust gases through the space defined between the side walls of the trailer. Subsequent to the distribution of the heated exhaust gases between the side walls, the exhaust gases are then exhausted through an exhaust port.

By the foregoing arrangement, an enclosed space in which the goods are transported in the trailer is kept apart from direct contact with the heated exhaust gases.

BRIEF DESCRIPTION OF THE DRAWINGS

FIG. 1 is a schematic perspective view of a trailer, cut away at the top and one end so as to show the flow of air and gases;

FIG. 2 is a top plan view of the trailer taken in cross-section so as to show inlet for the exhaust gases;

FIG. 3 is a top plan view of the trailer, taken in cross-section, and showing the ambient air inlets; and FIG. 4 is a side elevation view of the trailer, in schematic form, showing the inlets 4, the exhaust gases, ambient air and exhaust outlet.

DETAILED DESCRIPTION OF A PREFERRED EMBODIMENT

The trailer is shown generally at reference numeral 10 in cut-away form as to present details of the structural arrangement by which heated exhaust gases are supplied to the trailer so as to indirectly heat an enclosure 12 of the trailer. The construction of the trailer includes a first wall 14 having an exterior portion 16 and an interior portion 18. A second wall 20 has an interior portion 22 facing interior wall portion 18. The interior wall of the trailer bed is noted by reference numeral 24. Arrows A indicate the flow of ambient air into an upper most portion the trailer 10. Arrows B denote the flow of the mixed exhaust gases and ambient air throughout the interior of the trailer wall.

As shown in FIG. 2, a conduit 26 is connected to a bottom portion of the trailer and supplies heated exhaust gases from the engine of the vehicle which transports the trailer. The heated exhaust gases pass from the conduit 26 into an inlet 28 and then are delivered between the side walls 14 and 20 of the trailer. Interior side wall 18 of wall 14 faces side wall 22 of wall 20. A space 30 is defined between the facing walls 18 and 22. Accordingly, a space is provided for the circulation of the heated exhaust gases between the wall sections 14 and 20. Exhaust ports for the heated exhaust gases are indicated at reference numeral 32.

As described, FIG. 3 is a cross-section through an uppermost portion of the trailer 10. Arrow C indicates the direction of travel of the trailer. Air inlet scoops 34 are provided at an uppermost portion of the trailer and ambient air, indicated by arrow A, is shown in as being directed through openings 36 defined between the air scoops 34 and surrounding side wall portion 16. The ambient air enters the space 30 through the openings 36 and is directed through the space 30 due to the forward direction of movement of the trailer as indicated by the arrow C.

FIG. 4 is a side view which shows the inlet 28 for the heated exhaust gases and the inlet 36 for the ambient air. Reference 36 indicates the air directing channels discussed previously. As can be seen from FIG. 4, the heated exhaust air is directed through spaces of predetermined size provided between the facing side walls 18 and 22. Channels 38, 40, 42 and 44 circulate the heated exhaust gases continuously around the top, bottom, front, rear and selected side portions of the trailer 10. The heated exhaust gases are pulled through the channels 38, 40, 42 and 44 by a pressure differential created by the incoming ambient air indicated by arrow A. The pressure differential ensures that the heated exhaust gases will be drawn vertically upward through the channels along the entire length of the trailer portion. This provides for continuous circulation of the heated exhaust gases throughout predetermined sections of the trailer.

In operation, the trailer will be filled in its cargo area 12 with a cargo which is required to be kept at a temperature greater than the ambient temperature. The trailer will be hooked to a vehicle (not shown) provided with an engine and exhaust system. As the vehicle and trailer move in the direction indicated by the arrow C, the exhaust gases are connected by the conduit 26 into the trailer at a bottom portion of the trailer. As the trailer moves in the indicated direction, ambient air is forced into the air scoops 34 and through the openings 36 so as to move across the top portion of the trailer as indicated in FIG. 3. A pressure differential is created due to the velocity of the incoming ambient air and the exhaust gases emitted from an exhaust manifold of an internal combustion engine or other prime mover. The pressure differential draws the heated exhaust gases through the interior wall sections of the facing walls 18 and 22 so as to indirectly heat the cargo stored within the trailer 12. The exhaust gases are continually supplied, during operation of the vehicle and the movement of the trailer as it is being transported by the vehicle, assist the exhaust gases in being exhausted through exhaust ports 32 so as to ensure a continued supply of heated air to the trailer.

It is, of course, possible to embody the invention in other specific forms than those of the preferred embodiment described above. This may be done without departing from the essence of the invention. The preferred embodiment is merely illustrative and should not be considered restricted in any way. The scope of the invention is embodied in the appended claims rather than in the preceding description and all variations and changes which fall within the range of the claims are intended to be embraced therein.

What is claimed is:

1. A container body for a vehicle powered by an internal combustion engine, said container body comprising a front wall, opposite side walls, and a bottom interconnecting said side walls and said front wall, said front wall and said side walls having gas passages extending longitudinally of said side walls from adjacent said front wall, said front wall having conduit means for receiving exhaust gases from said internal combustion engine, ambient air inlet scoops in said side walls adjacent said front wall and communicating with a one of said longitudinal passages, and fluid outlet means in said side walls communicating with said longitudinal passages at a distance remote from said front wall, whereby the introduction of hot engine gases from said vehicle through said conduit means is drawn through said longitudinal passages by ambient air flowing into said scoop means and exhausting through said fluid outlet means to heat the interior of said body.

* * * * *